Aug. 4, 1959
R. H. CARVER
2,897,683
BELT TIGHTENERS
Filed Sept. 13, 1957
2 Sheets-Sheet 1
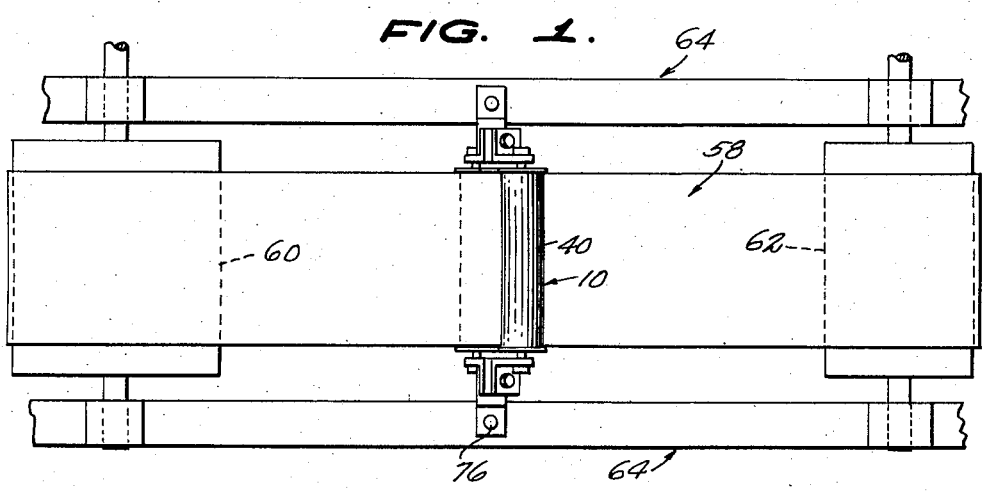
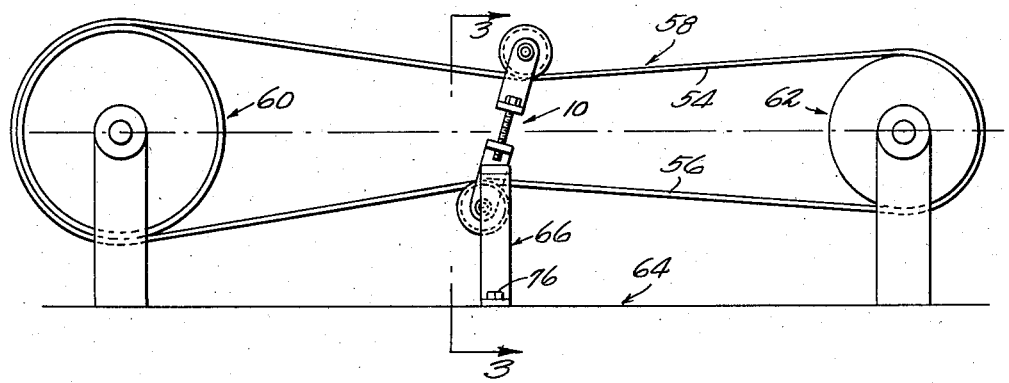
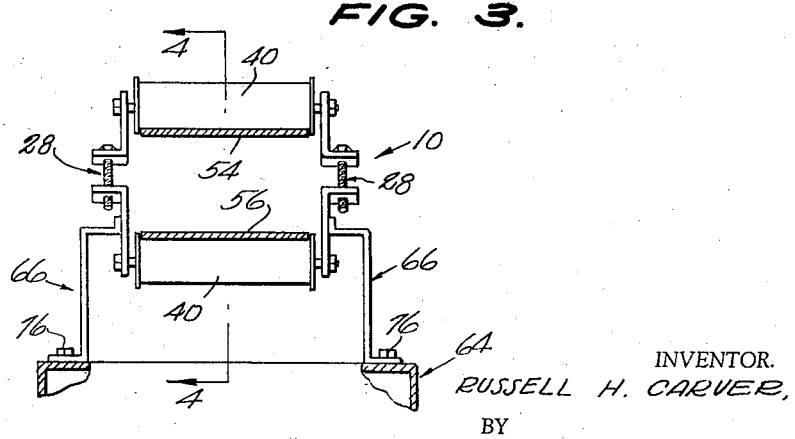
INVENTOR.
RUSSELL H. CARVER,
BY
McMorrow, Berman + Davidson
ATTORNEYS.

Aug. 4, 1959
R. H. CARVER
2,897,683
BELT TIGHTENERS
Filed Sept. 13, 1957
2 Sheets-Sheet 2
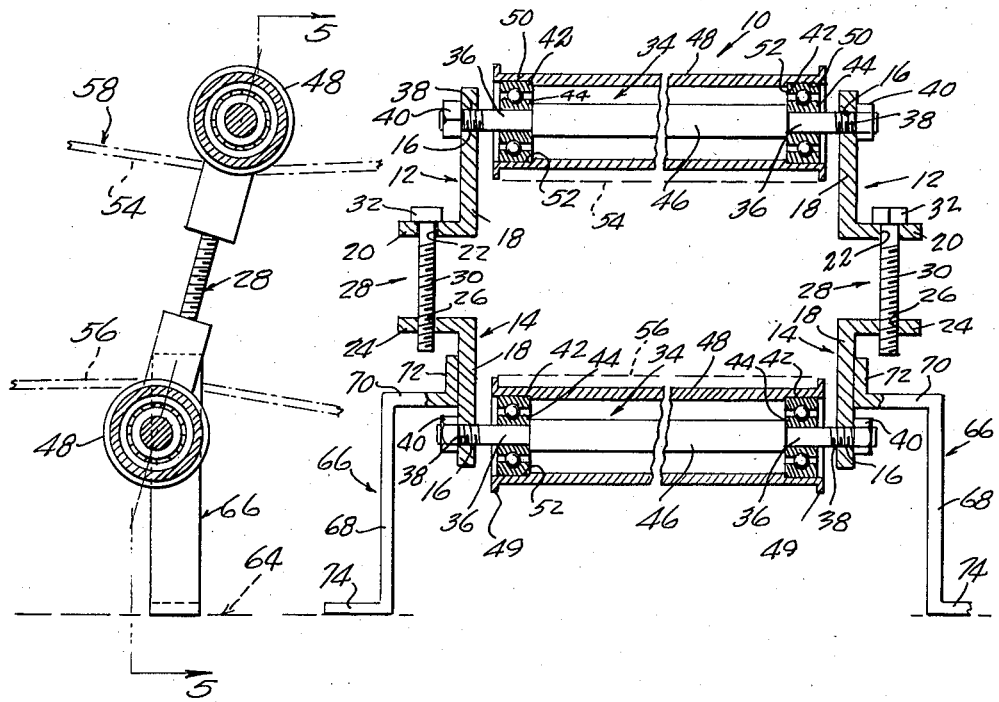
FIG. 4.
FIG. 5.
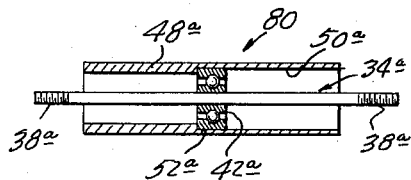
FIG. 6.
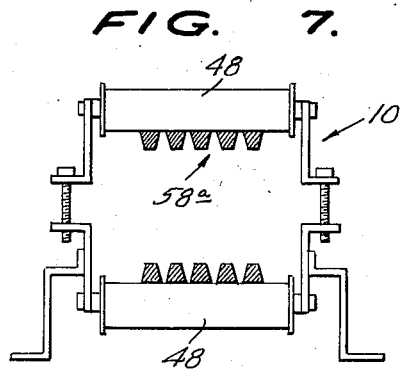
FIG. 7.
INVENTOR.
RUSSELL H. CARVER,
BY
McMorrow, Berman + Davidson
ATTORNEYS.

United States Patent Office

2,897,683
Patented Aug. 4, 1959

2,897,683
BELT TIGHTENERS

Russell H. Carver, Hope, Ark.

Application September 13, 1957, Serial No. 683,905

6 Claims. (Cl. 74—242.1)

This invention relates to improved adjustable tighteners for endless belts, of the V or flat types.

The primary object of the invention is to provide more practical and efficient belt tighteners of the type which compress opposed runs or flights of belts toward each other, the tighteners being of simpler construction and composed of a small number of simple and easily assembled parts, and being easily and accurately adjustable.

Another object of the invention is to provide belt tighteners of the character indicated above which are especially suitable for use with belts which operate between fixed centers which do not have other take-up means, on belts between horizontal and vertical pulleys, with twisted belts, and with belts which are to be reversed in direction, the said belt tighteners providing relatively large arcs of contact with opposed runs of belts and eliminating slapping and jumping of belts on their pulleys, so as to reduce wear on the belts and improve the transmission of power between pulleys by the belts.

A further object of the invention is to provide belt tighteners of the character indicated above which can be made in rugged and serviceable forms at relatively low cost from readily available materials.

Other important objects and advantageous forms of the invention will be apparent from the following description and the accompanying drawings, wherein, for purposes of illustration only, a specific form of the invention is set forth in detail.

In the drawings:

Figure 1 is a top plan view showing an installation of one form of the invention;

Figure 2 is a side elevation of Figure 1;

Figure 3 is a transverse vertical section taken on the line 3—3 of Figure 2;

Figure 4 is an enlarged vertical longitudinal section taken on the line 4—4 of Figure 3;

Figure 5 is a transverse vertical section taken on the line 5—5 of Figure 4;

Figure 6 is a longitudinal section taken through another form of rollers; and,

Figure 7 is an end elevation showing the belt tightener of Figures 1 to 5 used with a V-type belt.

Referring in detail to the drawings, and first to Figures 1 to 5 thereof, the illustrated belt tightener, generally designated 10, comprises two pairs of similar but reversed preferably L-shaped upper and lower brackets 12, 12 and 14, 14 having threaded bores 16 in their standards 18. The laterally outwardly projecting foot portions or arms 20, 20 of the upper brackets 12 have smooth bores 22 therein, and the foot portions or arms 24, 24 of the lower brackets 14, 14 have threaded bores 26 therein. Adjusting bolts or screws 28, 28 have their shanks 30 passed downwardly through the smooth bores 22 of the upper brackets and threaded through the threaded bores 26 of the lower brackets 14, 14, with their heads 32 bearing upon the upper sides of the upper bracket arms 20, 20. It will be understood that the bolts or screws 28, 28 can be reversed where desirable; and that where desirable turn buckle assemblies could be used instead of the adjusting bolts 28 and the bracket arms 20 and 24.

Roller shafts 34 have reduced pintles 36 on their ends which terminate in threaded portions 38. The shafts 34 extend between the standards 18 of the brackets with their threaded portions 38 threaded through the bores 16 and have lock nuts 40 thereon which bear against the outer sides of the standards 18, as shown in Figure 5. Roller or ball bearing assemblies 42 are engaged on the pintles 36 and bear against shoulders 44 on the shafts 34 at the junctures of the pintles with the shaft bodies 46.

Preferably hollow plain cylindrical rollers 48, substantially larger in diameter than the shaft bodies 46 surround the shafts 34 and have bored-out ends 50 defining shoulders 52 at their inward ends, the bearing assemblies 42 being seated in the bored-out ends 50 against the shoulders 52. The bearing assemblies 42 are suitably secured in place within the ends of the rollers 48. Opposed upper and lower runs or flights 54 and 56 of a flat endless belt 58 are engaged on their remote or outward sides by the rollers 48, at points between and spaced from pulleys 60 and 62 over which the flat belt 58 is trained for transmission of power therebetween. The rollers 48 have belt retaining flanges 49 on their ends.

In Figure 7 is shown a similar relationship of the tightener 10 relative to a V-type belt 58a.

For stabilizing and anchoring the tightener relative to a stationary support 64, such as a machine part, a floor or a wall, stabilizer brackets or arms 66 are provided for one of the pairs of roller brackets. The stabilizer arms 66 comprise vertical portions 68 which are parallel to the standards 18 of the brackets, inwardly directed lateral arms 70 on one end which are secured, as indicated at 72 to the outer sides of the bracket standards 18, as of the brackets 14, 14 and outwardly directed lateral arms 74 on their other ends which are secured, as indicated at 76, to the support 64. As shown in Figures 2 and 4, the stabilizer arms 66 are angled relative to the bracket standards 18, so that the tightener 10 is canted or inclined toward one of the pulleys, such as the pulley 62, so that the upper and lower rollers bear upon longitudinally spaced or vertically offset points of the belt runs.

In Figure 6 is shown another form of roller structure, generally designated 80, which is suitable for use in a belt tightener of the character described above, for use with relatively narrow belts, and which comprises a hollow plain cylindrical roller 48a which is bored out from one end, as indicated at 50a, to a point slightly beyond midway between the ends of the roller and defines a shoulder 52a. A single roller or ball bearing assembly 42a is positioned centrally in the bored-out portion 50a in roller 48a and suitably secured therein against the shoulder 52a, and a plain cylindrical shaft 34a extends through the bearing assembly 42a and is suitably secured thereto and has threaded ends 38a outwardly of the ends of the roller 48a for threaded engagement in tightener roller brackets as described hereinabove.

Although I have shown and described herein specific forms of the invention, it is to be understood that any change or changes in the forms of and in the relative arrangements of the components are contemplated as being within the spirit and scope of the invention as defined by the claims appended hereto.

What is claimed is:

1. A belt tightener consisting of two pairs of opposed and reversed roller brackets, belt roller assemblies journaled on and extending between the brackets of each pair, and tightening screw means extending between and spacing and connecting related ones of the brackets of the pairs, said roller assemblies comprising shafts having body portions terminating at their ends in reduced pintles defining shoulders at the ends of the bodies, said pintles having threaded ends threaded in related brackets, bearings on the pintles engaged with said shoulders, and hollow rollers spacedly circumposed on the shafts and having bored-out end portions receiving and secured to the bearings, and stabilizer brackets fixed to the brackets of one of said pairs for mounting on a support.

2. In combination, a relatively wide endless belt having opposed runs extending between pulleys over which the belt is trained, first and second rollers engaged with the outward sides of related runs of the belt between the pulleys, first and second pairs of laterally spaced roller brackets having outer ends between and on which related rollers are journaled, said roller brackets having inner ends, tightening screws extending between and threaded on the inward ends of related roller brackets, the related roller brackets being otherwise unconnected to each other and otherwise unsupported, and stabilizer brackets having inner ends fixed on the roller brackets of one pair and extending in a direction away from the other pair of roller brackets and beyond the adjacent belt run, said stabilizer brackets having outer ends securable to a support.

3. The combination of claim 2, wherein said screws are located at the laterally outward sides of the roller brackets and are spaced laterally outwardly from related edges of the belt runs.

4. The combination of claim 2, wherein said screws are located at the laterally outward sides of the roller brackets and are spaced laterally outwardly from related edges of the belt runs, and the stabilizer brackets are located at the laterally outward sides of said one pair of roller brackets.

5. A belt tightener consisting of two laterally spaced stabilizer brackets having first ends for fixed mounting on a support and second ends, a first pair of laterally spaced roller brackets having first ends fixed to related stabilizer brackets at the second ends of the stabilizer brackets and second ends, a second pair of laterally spaced roller brackets aligned with said first pair of roller brackets, the brackets of said second pair having first and second ends, the second ends of the brackets of said second pair being adjacent to and spaced from the second ends of the brackets of said first pair and the first ends thereof being remote from the second ends of the brackets of said first pair, tightening screws extending between the second ends of the brackets of said first and second pairs of brackets, one end of said screws being securably engaged with the second ends of the brackets of one pair and being threaded in the second ends of brackets of the other pair of brackets, first and second roller shafts extending between the brackets of the first and second pairs, said roller shafts being threaded at their ends in related brackets and serving to space and connect such brackets, and rollers circumposed on the roller shafts between related brackets, said tightening screws being the sole means of supporting said second pair of roller brackets on said first pair of roller brackets.

6. A belt tightener according to claim 5, wherein the second ends of the brackets of said one pair have smooth bores through which said one end of the screws are slidably engaged, the said one end of the screws having heads thereon bearing retainably against the last mentioned brackets.

References Cited in the file of this patent
UNITED STATES PATENTS

| | | |
|---|---|---|
| 691,538 | Frigerio | Jan. 21, 1902 |
| 887,831 | Muth | May 19, 1908 |
| 888,031 | Parrish | May 19, 1908 |
| 1,502,976 | Baldwin et al. | July 29, 1924 |
| 1,582,516 | Gibson | Apr. 27, 1926 |
| 2,066,721 | Eaton | Jan. 5, 1937 |
| 2,270,000 | Danker | Jan. 13, 1942 |
| 2,636,221 | Meadows et al. | Apr. 28, 1953 |

FOREIGN PATENTS

| | | |
|---|---|---|
| 174,480 | Germany | Sept. 25, 1906 |
| 319,307 | Germany | Mar. 4, 1920 |